UNITED STATES PATENT OFFICE.

NATHANIEL C. FOWLER, JR., OF BOSTON, MASSACHUSETTS; FANNIE A. FOWLER ADMINISTRATRIX OF SAID NATHANIEL C. FOWLER, DECEASED.

FOOD PRODUCT.

1,349,753. Specification of Letters Patent. Patented Aug. 17, 1920.

No Drawing. Application filed October 4, 1915, Serial No. 53,878. Renewed January 7, 1920. Serial No. 350,062.

*To all whom it may concern:*

Be it known that I, NATHANIEL C. FOWLER, Jr., a citizen of the United States, residing at Boston, in the county of Suffolk and State of Massachusetts, have invented new and useful Improvements in Food Products, of which the following is a specification.

This invention relates to improvements in food products. More particularly it relates to a method of incorporating nuts with ground cereal products in the form of flour, meal, bread, cake, crackers, and the like.

Wheat and other cereals have been the staple food of mankind for many centuries, and by far the greater part of mankind has also been carnivorous, although it has been known that much of the food value of meats is obtainable from nuts. Nothwithstanding this, and the widespread desire to work out a practicable diet that would not be so dependent upon meats, either in a dietetic sense or in a commercial sense, no method has been devised so far as I am aware by which the essential food properties in the nuts can be combined with cereal properties in a palatable form of bread, cake, pastry, crackers, and the like. I believe that this is due to the oily ingredients of the nuts, because of which all nuts are liable to become rancid or otherwise to deteriorate in edibility on being left standing for some time. It is true that nuts have been used with flour, baked in bread, cake, etc., with the nut structure substantially unaltered, *i. e.*, used as whole nuts or as pieces of whole nut meat more or less cut up, but still preserving the characteristics of the uncut meat of the nut; but the nuts are not materially different in character from the same nuts when unincorporated and are subject to the same objections. It is also true that nuts have been crushed into a waxy or oily form known as nut butter, but these also are useless for the purposes of the invention. It is a purpose of the present invention to provide a means for incorporating nuts with flour, etc., the term "flour" being used in a broad sense as signifying any kind of ground cereal or the equivalent, without the nut constituent being subject to the deterioration and the other characteristics of whole nuts or cut pieces of nuts as heretofore used. This is accomplished by first subjecting the nuts to extreme pressure, so that the essential oil of the nuts is forced out, leaving only a dried cake. This cake may then be ground to a flour as fine as desired, and mixed with wheat or other flour, or a combination of various flours, in desired proportions; and the compound thus formed treated as the flour for making bread, cake or other food. Some of the oil which has been extracted from the nuts is returned thereto as shortening when this flour is mixed as dough, in place of the butter or lard which it has hitherto been customary to use. An illustrative example of the practice of the invention is given hereinafter, but it should be understood that this is only an illustration and that the invention itself may take many forms within the scope of the appended claims. It is intended to cover by the appended claims whatever features of patentable novelty exist in the invention disclosed.

For a more specific and detailed understanding of the invention and the manner of utilizing it, I give the following illustrative example of the method of making bread according to the invention. Assuming that bread of a particular type is wanted, such as wheat bread, or so-called whole wheat or rye bread, a suitable quantity of the flour, or mixture of various flours, is prepared by the simple process of mixing the ingredients as and when wanted. To this is to be added a suitable portion of the nut flour which I am about to describe. This nut flour is made by taking whatever nuts are chosen, such, for example, as peanuts which are both nutritious and relatively inexpensive, and wrapping or placing them in a folded cloth or in a bag of material such as camel's-hair or any other material adaptable to the purpose, and subjecting them to heavy pressure, such as by steam or hydraulic means, as is already well understood in the operation of making peanut cake. This extracting of oil separates the oily constituents from the solid constituents of the nuts and leaves the solid constituents dry. I subject this solid residue to further compression if it appears to be necessary in order to extract any remaining oil, and then I grind it to a fineness approximating that of flour. It is then ready to be mixed with ordinary flour or meal in whatever proportions are desired; and this mixture, to which moisture is added in the form of milk, water or other liquid, is kneaded as dough in the ordinary manner. Yeast or other means for making dough rise may be added; and some of the oil that has been expressed is added for shortening, according to whatever quality is wanted for the particular variety of cooked food that is planned. If preferred, other shortening may be employed, but it makes a harmonious product to use the nut flour and the oil of the same nut as shortening in connection with the wheat or other cereal flour. As the yeast ordinarily will not act upon the nut flour, the proportion of wheat flour should be large enough to provide the necessary starchy food for the yeast, and to produce the desired rise of dough when baked; but subject to this qualification the proportion of nut flour may be as great as is found palatable, or in such proportion as it may be desired to have incorporated in the product for dietetic reasons.

While separated thus the nut flour and the nut oil are easily preserved. the nut flour because it is so dry and so free from oil and water, the nut oil because it can be kept in receptacles from which the air is excluded. By thus separating them, the precise amount of oil which is useful in the dough on principles of cookery can be incorporated therein, without the product being spoiled by the incorporation of a larger proportion and its general dissemination through the mass; or more can be added than exists in whole nuts. In either event the oil is separate from the solids of the nuts, and is so combined in the mass as to exercise a proper effect on the whole according to the art of cookery, instead of being combined in its natural state with the solids of the nuts as in whole nuts, in which condition the proportion of the oil is uncontrollable, and the status is not as good for purposes of digestion. Peanuts may be purchased in the market either roasted or unroasted; and either form may be used. I regard it as important that the grinding operation should be preceded by the crushing operation. Whole nuts can readily be ground, but on account of the presence of the oil they cannot thus be made into a flour. Instead they become a moist and plastic oily mass, which is not capable of use as a dry flour for mixture in general dissemination throughout another body of dry flour, and which is not capable of mixture with water or milk in the process of making and kneading dough.
One formula for carrying out the process from whole nuts to a finished product such as bread would be as follows: take a quantity of peanuts or other nuts and subject them to heavy pressure to eliminate their oil, separating the oil from the solids. The solids should then be ground fine into flour. For making bread then take from 75 to 95 per cent. of wheat flour and add to this from 5 to 25 per cent. of finely ground peanuts or other nuts, from which the whole or the greater part of the oil has been extracted. If preferred, in place of the wheat flour one may use a combination of wheat flour with whole wheat flour, bran, rye, corn-meal, or other flours and grains, in any proportion aggregating that amount. Mix well. To this combination add peanut or other nut oil in quantity substantially equivalent to the amount of butter, lard or other shortening usually placed in the bread. Milk may or may not be used. If added, use the usual amount employed in making bread. Yeast may be used as in making bread. Knead and bake the dough substantially the same as in the case of ordinary white bread. Baking powder or other baking preparation may be used for cake or other food products where baking powder is suitable instead of yeast.

Although from five to twenty-five per cent. of the nut meal is suggested, it is evident that the proportion might be smaller, and that it might be larger if not so great as to prevent the bread, cake or other ultimate form into which the food is to be made from being as light and sweet as desired. There is so great a range of taste among people as to what is palatable or is desired that the precise proportioning, and addition of other ingredients than those mentioned, if any, must be left to the art of the cook according to the particular result which it is desired to produce. A materially larger proportion of nut flour may be used if the ultimate form is not to be raised, like bread, nor light, like cake, rolls, or "biscuit" as rolls are commonly called in America, but is to be more or less solid, like "biscuit" as commonly called in England, or crackers as commonly called in America. A notably useful form of the invention is produced by the combination of wheat flour, bran, and nut flour, which may go far toward solving problems of camping or traveling parties, whose facilities for carrying meats are limited. This results from the fact that meats are half water more or less, (fresh beef having from 60 to 70 per cent. and even commercial dried beef being shown to have about 45 per cent. of water) while the water constituent of nuts, before they are subjected to the pressing and drying operation may range from 3 to 9 per cent. At the same time the nuts may have an amount of protein comparable to that of beef; more fat, thus making up for the deficiency of fats in cereal flour; a fairly large percentage of carbohydrates, which are suited for furnishing the energy needed for hard work; while the incorporation of a reasonable amount of bran adds little to the weight and by its mineral and irritative qualities keeps the digestive processes working properly on the other ingredients.

I claim as my invention:—

1. A food product comprising a body of cooked material having cereal flour as its basis and having intermingled therewith the ground solids of nuts from which oil has been removed, and nut oil, the nut oil being separate from the nut cellular structure in which it was originally found.

2. A concentrated food product having low water content, and considerable protein, fat and carbohydrates, comprising the mixture of cereal flour with finely ground solids of nuts, and cereal husks; the essential oil of the nuts having been removed from the said solids of nuts.

3. A concentrated food product having low water content and considerable protein, fat and carbohydrates, embodying the cooked product of a mixture of cereal flour with nut products; the said nut products comprising finely ground solids of nuts from which the essential oil has been removed, and nut oil dissociated from the cellular structure originally containing it.

4. A food product, comprising the cooked product of a mixture containing nut materials, including constituent solids from which the oily elements have been separated, finely ground, and nut oil dissociated from the cellular structure originally containing it.

Signed by me at Boston, Mass., this second day of October, 1915.

NATHANIEL C. FOWLER, Jr.

Witnesses:
EVERETT E. KENT,
ETHEL P. HUNTING.